United States Patent
Tang

(10) Patent No.: US 10,120,220 B2
(45) Date of Patent: Nov. 6, 2018

(54) FOLDABLE LIQUID CRYSTAL DISPLAY DEVICE AND MANUFACTURING METHOD THEREOF

(71) Applicant: Wuhan China Star Optoelectronics Technology Co., Ltd., Wuhan (CN)

(72) Inventor: Yuejun Tang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 199 days.

(21) Appl. No.: 15/125,190

(22) PCT Filed: Aug. 19, 2016

(86) PCT No.: PCT/CN2016/095939
§ 371 (c)(1),
(2) Date: Sep. 12, 2016

(87) PCT Pub. No.: WO2018/010251
PCT Pub. Date: Jan. 18, 2018

(65) Prior Publication Data
US 2018/0217433 A1    Aug. 2, 2018

(30) Foreign Application Priority Data
Jul. 15, 2016    (CN) .......................... 2016 1 0560383

(51) Int. Cl.
*G02F 1/1333*    (2006.01)
*G06F 1/16*    (2006.01)
(Continued)

(52) U.S. Cl.
CPC ...... *G02F 1/133305* (2013.01); *G02F 1/1333* (2013.01); *G02F 1/1336* (2013.01);
(Continued)

(58) Field of Classification Search
CPC ................. G06F 1/1652; G06F 1/1641; G02F 1/133305; G02F 1/133528; G02F 1/1336;
(Continued)

(56) References Cited

U.S. PATENT DOCUMENTS

| 8,654,095 B1* | 2/2014 | Cho ...................... G06F 3/0412 345/173 |
| 2007/0097014 A1* | 5/2007 | Solomon ............... G06F 1/1616 345/1.1 |

(Continued)

*Primary Examiner* — Jia Pan
(74) *Attorney, Agent, or Firm* — Leong C. Lei

(57) ABSTRACT

A foldable liquid crystal display device and a method for manufacturing the foldable liquid crystal display device are provided. The foldable liquid crystal display device includes displaying sections, each of which includes a pair of rigid substrates. The displaying sections are connected together with flexible substrates. Folding sections are provided between the displaying sections so that the flexible substrates are foldable along the folding sections to have the displaying sections stacked on each other. Thus, expanding the displaying sections allows for expansion of a displaying area of the liquid crystal display device and folding the displaying sections allows for reduction of a space occupied by the liquid crystal display device to facilitate carrying. By adopting different display modes for different ones of the displaying sections, application scenarios of the liquid crystal display device can be made versatile.

12 Claims, 6 Drawing Sheets

(51) Int. Cl.
 *G02F 1/1335* (2006.01)
 *G09F 9/30* (2006.01)
 *G02F 1/1347* (2006.01)
 *G02F 1/13357* (2006.01)

(52) U.S. Cl.
 CPC ...... *G02F 1/1347* (2013.01); *G02F 1/133528* (2013.01); *G02F 2001/133302* (2013.01); *G02F 2203/01* (2013.01); *G02F 2203/02* (2013.01); *G06F 1/1641* (2013.01); *G06F 1/1652* (2013.01)

(58) Field of Classification Search
 CPC ....... G02F 1/1333; G02F 2001/133302; G02F 1/1347; G09F 9/301
 See application file for complete search history.

(56) References Cited

U.S. PATENT DOCUMENTS

| | | | | |
|---|---|---|---|---|
| 2009/0021666 A1* | 1/2009 | Chen | ............... | G02F 1/133305 349/58 |
| 2010/0182265 A1* | 7/2010 | Kim | ............... | G06F 1/1616 345/173 |
| 2010/0201603 A1* | 8/2010 | Kee | ............... | G06F 1/1601 345/1.3 |
| 2010/0201604 A1* | 8/2010 | Kee | ............... | G06F 1/1616 345/1.3 |
| 2012/0014054 A1* | 1/2012 | Ashcraft | ............... | G06F 1/1626 361/679.26 |
| 2012/0235894 A1* | 9/2012 | Phillips | ............... | G09G 3/36 345/156 |
| 2012/0262367 A1* | 10/2012 | Chiu | ............... | G06F 1/1626 345/156 |
| 2013/0229324 A1* | 9/2013 | Zhang | ............... | G09G 5/00 345/1.3 |
| 2014/0065326 A1* | 3/2014 | Lee | ............... | G06F 1/16 428/12 |
| 2015/0022436 A1* | 1/2015 | Cho | ............... | G06F 1/1652 345/156 |
| 2015/0029652 A1* | 1/2015 | Min | ............... | G06F 1/1652 361/679.27 |

\* cited by examiner

FOLDABLE LIQUID CRYSTAL DISPLAY DEVICE AND MANUFACTURING METHOD THEREOF

BACKGROUND OF THE INVENTION

1. Field of the Invention

The present invention relates to the field of display technology, and in particular to a foldable liquid crystal display device and a manufacturing method thereof.

2. The Related Arts

Flat panel display devices have various advantages, such as thin device body, lower power consumption, and being free of radiation, and are thus widely used. The flat panel display devices that are currently used include liquid crystal displays (LCDs) and organic light emitting displays (OLEDs).

The liquid crystal displays are the most commonly used flat panel displays and have taken a major portion of the flat panel display market based on advantages such as mature manufacturing operations, low manufacturing cost, and excellent display images.

Most of the liquid crystal displays that are currently available in the market are backlighting liquid crystal displays, which comprise a liquid crystal display panel and a backlight module. The liquid crystal display panel comprises a color filter (CF) substrate, a thin-film transistor (TFT) array substrate, a liquid crystal layer arranged between the two substrates and the operation principle is that with liquid crystal molecules disposed between the two substrates, multiple vertical and horizontal tiny wires that are arranged between the two substrate allows for control of electric fields established in the liquid crystal layer to control the liquid crystal molecules to change direction thereby regulating polarization of liquid projecting from the backlight module into the liquid crystal layer to make the liquid crystal panel display an image.

Heretofore, a regular liquid crystal display device has one single displaying surface and viewers can only watch a displayed image from the displaying surface. Also, the displaying surface usually has a size that is fixed and invariable after being manufactured. However, the general desire of consumers is to include a relatively large displaying surface on the display device, but also requiring the display device can be carried easily. For example, for a display screen of a mobile phone, for easy carrying of the mobile phone, the display screen of the mobile phone is limited to a specific size range. This makes it not possible for users to enjoy watching images on the mobile phone screen in the same way as displayed on a large-size screen. On the other hand, the existing large-sized liquid crystal displays are generally bulky, making it adverse to transportation and carrying. Further, in certain applications, there may be two viewers who want to watch different messages, programs, or images at the same time, and in this case, the liquid crystal display device having one single displaying surface cannot meet the needs of the viewers. Thus, further exploitation of applications and ways of use of the liquid crystal display devices are desired.

SUMMARY OF THE INVENTION

An object of the present invention is to provide a foldable liquid crystal display device, which allows for foldability of a liquid crystal display and helps expand a displaying area of a liquid crystal display of a small-sized terminal so as to enrich applications of liquid crystal display devices.

Another object of the present invention is to provide a manufacturing method of a foldable liquid crystal display device, which allows for foldability of a liquid crystal display and helps expand a displaying area of a liquid crystal display of a small-sized terminal so as to enrich applications of liquid crystal display devices and simplify the manufacturing process of the foldable liquid crystal display devices.

To achieve the above objects, the present invention provides a foldable liquid crystal display device, which comprises a first flexible substrate, a second flexible substrate opposite to the first flexible substrate, a liquid crystal layer arranged between the first flexible substrate and the second flexible substrate, a plurality of spaced first rigid substrates arranged on a surface of the first flexible substrate that is distant from the second flexible substrate, and a plurality of second rigid substrates arranged on a surface of the second flexible substrate that is distant from the first flexible substrate and respectively corresponding to the plurality of first rigid substrates;

each of the first rigid substrate being paired with one of the second rigid substrate corresponding thereto to collectively define an area that forms a displaying section of the foldable liquid crystal display device;

two adjacent ones of the displaying sections defining therebetween a spacing area that forms a folding section;

wherein to fold, the first flexible substrate and the second flexible substrate are folded along the folding section such that the displaying sections located on two opposite sides of the folding section are stacked on each other or define an included angle therebetween.

The first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the first polarization plate of the second displaying section being provided, on a side thereof that is distant from the first rigid substrates, with a second backlight module.

The first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the second polarization plate of the second displaying section being provided, on a side thereof that is distant from the second rigid substrates, with a second backlight module.

The first displaying section and the second displaying section have different ranges of viewing angle.

The first rigid substrates and the second rigid substrates each have a number of two to respectively define two displaying sections and one folding section, the two displaying sections being respectively defined as a first displaying section and a second displaying section;

the first displaying section adopting transmissive displaying, the second displaying section adopting reflective displaying;

the first rigid substrate of the first displaying section being provided, on a surface thereof that is distant from the second rigid substrates, with a first polarization plate, the second rigid substrate of the first displaying section being provided, on a surface thereof that is distant from the first rigid substrates, with a second polarization plate;

the first rigid substrate of the second displaying section being provided, on a surface thereof that is distant from the second rigid substrates, with a first polarization plate;

the first polarization plate of the first displaying section being provided, on a side thereof that is distant from the first rigid substrates, with a first backlight module;

the second flexible substrate of the second displaying section being provided, on a side thereof adjacent to the first flexible substrate, with a reflective layer.

The present invention also provides a manufacturing method of a foldable liquid crystal display device, which comprises the following steps:

(1) providing a first rigid main board and forming a first flexible substrate on the first rigid main board;

(2) providing a second rigid main board and forming a second flexible substrate on the first rigid main board;

(3) combining and boxing the first rigid main board and the second rigid main board that comprise the first flexible substrate and the second flexible substrate formed thereon and filling liquid crystal therebetween to form a liquid crystal layer; or, alternatively, dropping liquid crystal onto one flexible substrate of the first flexible substrate and the second flexible substrate and applying enclosure resin thereto and then combining and boxing the first rigid main board and the second rigid main board that comprise the first flexible substrate and the second flexible substrate formed thereon such that the first flexible substrate and the second flexible substrate are opposite to each other so as to form a liquid crystal layer between the first flexible substrate and the second flexible substrate; and (4) cutting the first rigid main board and the second rigid main board so as to respectively form a plurality of spaced first rigid substrates arranged on a surface of the first flexible substrate that is distant from the second flexible substrate and a plurality of second rigid substrates arranged on a surface of the second flexible substrate that is distant from the first flexible substrate and respectively corresponding to the plurality of first rigid substrates;

wherein each of the first rigid substrates is paired with one of the second rigid substrates corresponding thereto to collectively define an area that forms a displaying section of a foldable liquid crystal display device;

two adjacent ones of the displaying sections define therebetween a spacing area that forms a folding section; and the first flexible substrate and the second flexible substrate are foldable along the folding section such that the displaying sections located on two opposite sides of the folding section are stacked on each other or define an included angle therebetween.

The first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the first polarization plate of the second displaying section being provided, on a side thereof that is distant from the first rigid substrates, with a second backlight module.

The first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the second polarization plate of the second displaying section being provided, on a side thereof that is distant from the second rigid substrates, with a second backlight module.

The first displaying section and the second displaying section have different ranges of viewing angle.

The first rigid substrates and the second rigid substrates each have a number of two to respectively define two displaying sections and one folding section, the two displaying sections being respectively defined as a first displaying section and a second displaying section;

the first displaying section adopting transmissive displaying, the second displaying section adopting reflective displaying;

the first rigid substrate of the first displaying section being provided, on a surface thereof that is distant from the second rigid substrates, with a first polarization plate, the second rigid substrate of the first displaying section being provided, on a surface thereof that is distant from the first rigid substrates, with a second polarization plate;

the first rigid substrate of the second displaying section being provided, on a surface thereof that is distant from the second rigid substrates, with a first polarization plate;

the first polarization plate of the first displaying section being provided, on a side thereof that is distant from the first rigid substrates, with a first backlight module;

the second flexible substrate of the second displaying section being provided, on a side thereof adjacent to the first flexible substrate, with a reflective layer.

The present invention further provides a foldable liquid crystal display device, which comprises a first flexible substrate, a second flexible substrate opposite to the first flexible substrate, a liquid crystal layer arranged between the first flexible substrate and the second flexible substrate, a plurality of spaced first rigid substrates arranged on a surface of the first flexible substrate that is distant from the second flexible substrate, and a plurality of second rigid substrates arranged on a surface of the second flexible substrate that is distant from the first flexible substrate and respectively corresponding to the plurality of first rigid substrates;

each of the first rigid substrate being paired with one of the second rigid substrate corresponding thereto to collectively define an area that forms a displaying section of the foldable liquid crystal display device;

two adjacent ones of the displaying sections defining therebetween a spacing area that forms a folding section;

wherein to fold, the first flexible substrate and the second flexible substrate are folded along the folding section such that the displaying sections located on two opposite sides of the folding section are stacked on each other or define an included angle therebetween;

wherein the first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the second polarization plate of the second displaying section being provided, on a side thereof that is distant from the second rigid substrates, with a second backlight module.

The efficacy of the present invention is that the present invention provides a foldable liquid crystal display device, which comprises a plurality of displaying sections and each of the displaying sections comprises a pair of rigid substrates, wherein the displaying sections are connected together with flexible substrates and folding sections are provided between the displaying sections so that the flexible substrates are foldable along the folding sections to have the displaying sections of the liquid crystal display device stacked on each other, whereby expanding the plurality of displaying sections allows for expansion of a displaying area of the liquid crystal display device and folding the plurality of displaying sections allows for reduction of space occupied by the liquid crystal display device to facilitate carrying. By adopting different display modes for different ones of the displaying sections, application scenarios of the liquid crystal display device can be made versatile. The present invention also provides a manufacturing method of a foldable liquid crystal display device, which helps achieve foldability of a liquid crystal display device, expands a displaying area of a liquid crystal display device involved in a small-sized terminal device, enriches application scenarios of a liquid crystal display device, and simplifies a manufacturing process of a foldable liquid crystal display device.

BRIEF DESCRIPTION OF THE DRAWINGS

The features and technical contents of the present invention will be better understood by referring to the following detailed description and drawings the present invention. However, the drawings are provided for the purpose of reference and illustration and are not intended to limit the scope of the present invention.

In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 1:
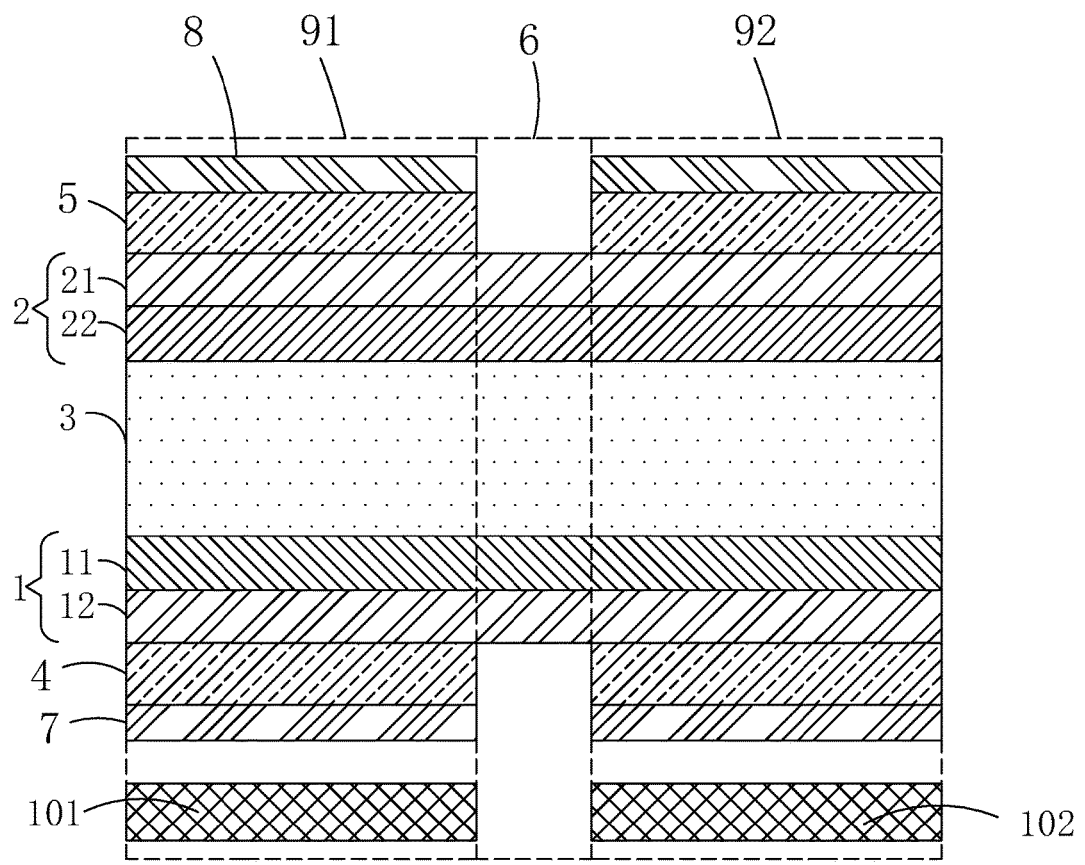
FIG. 1 is a schematic view illustrating a first example of a foldable liquid crystal display device according to the present invention.

Referring to FIG. 1, firstly, the present invention provides a foldable liquid crystal display device, which comprises: a first flexible substrate 1, a second flexible substrate 2 opposite to the first flexible substrate 1, a liquid crystal layer 3 arranged between the first flexible substrate 1 and the second flexible substrate 2, a plurality of spaced first rigid substrates 4 arranged on a surface of the first flexible substrate 1 that is distant from the second flexible substrate 2, and a plurality of second rigid substrates 5 arranged on a surface of the second flexible substrate 2 that is distant from the first flexible substrate 1 and respectively corresponding to the plurality of first rigid substrates 4.

Each of the first rigid substrate 4 is paired with one of the second rigid substrate 5 corresponding thereto to collectively define an area that forms a displaying section of the foldable liquid crystal display device.

Two adjacent ones of the displaying sections define therebetween a spacing area that forms a folding section.

To fold, the first flexible substrate 1 and the second flexible substrate 2 are folded along the folding section such that the displaying sections located on two opposite sides of the folding section are stacked on each other.

Further, for displaying sections that adopt transmissive displaying, the first rigid substrates 4 are each provided, on a surface thereof distant from the second rigid substrates 5, with a first polarization plate 7, and the second rigid substrates 5 are each provided, on a surface thereof distant from the first rigid substrates 4, with a second polarization plate 8. For displaying sections that adopt reflective displaying, the rigid substrates that are arranged on the side associated with a displaying surface are each provided, on a surface thereof distant from the liquid crystal layer 3, with a first polarization plate 7, while no polarization plate is provided on a non-displaying surface. Particularly, in case that a polarization plate involved is flexible, the first polarization plates 7 or the second polarization plates 8 that are arranged in a spaced manner can be replaced with an arrangement of full-surface coverage, meaning a first polarization plate 7 or a second polarization plate 8 covers not only the displaying section(s) but also the folding section(s).

Specifically, the first flexible substrate 1 comprises a first flexible backing plate 12 and a first film layer 11 arranged on the first flexible backing plate 12; and the second flexible substrate 2 comprises a second flexible backing plate 21 and a second film layer 22 arranged on the second flexible backing plate 21. The first film layer 11 may comprise one of an array-substrate function layers assembly and a color-filter-substrate function layers assembly, while the second film layer 22 comprises one of the array-substrate function layers assembly and the color-filter-substrate function layers assembly that is other than and different from that of the first film layer 11. The array-substrate function layers assembly and the color-filter-substrate function layers assembly respectively comprise various film layers that are known arranged on and involved in an array substrate and a color filter substrate of a liquid crystal display device. For example, the array-substrate function layers assembly may comprises: a thin-film transistor array and pixel electrodes arranged on the thin-film transistor array and electrically connected to the thin-film transistor array and the color-filter-substrate function layers assembly may comprise: a color filter film, a black matrix arranged on the color filter film, and a common electrode arranged on the color filter film. The array-substrate function layers assembly and the color-filter-substrate function layers assembly are both known from the prior art and no description will be given herein.

Further, the first rigid substrates 4 and the second rigid substrates 5 can be formed of glass, metal, or ceramics, preferably thin glass sheets. The first and second flexible backing plates 12, 21 can be formed of any suitable insulation materials that are flexible, such as polyimide, polycarbonate, polyestersulfone, polyethylene terephthalate, polyethylene naphthalate, polyarylate, or glass fiber reinforced plastics. Specifically, the folding section may have a range of width and may be adjusted according to the size of the liquid crystal display device and the sizes of electronic products that involve the liquid crystal display device, and is preferably between 0-5 mm, and more preferably a relatively small figure, such as 0 mm, 0.1 mm, or 0.2 mm. Further, the foldable liquid crystal display device may be structured to avoid light leaking in the folding section by adjusting pre-tilt angle of the liquid crystal in the folding section or by arranging a black light-shielding material in the folding section to cover the folding section.

Preferred examples of the present invention will be provided below for detailed illustration of the present invention. In all the following preferred examples, the foldable liquid crystal display device is structured to comprise two first rigid substrates and two second rigid substrates so as to form, correspondingly, two displaying sections and one folding section 6, where the two displaying sections are respectively referred to as a first displaying section 91 and a second displaying section 92.

Referring to FIG. 1, in a first example of the present invention, the first displaying section 91 and the second displaying section 92 both adopt transmissive displaying, wherein the first polarization plate 7 of the first displaying section 91 is provided, on a side thereof that is distant from the first rigid substrate 4, with a first backlight module 101, and the first polarization plate 7 of the second displaying section 92 is provided, on a side thereof that is distant from the first rigid substrate 4, with a second backlight module 102. In other words, the first displaying section 91 and the second displaying section 92 each have a displaying surface that is located on a side thereof associated with the second flexible substrate 2. With such an arrangement, folding can be made along the folding section 6 to have the first backlight module 101 of the first displaying section 91 and the second backlight module 102 of the second displaying section 92 stacked on each other in a back-to-back manner to provide dual-surface displaying, or alternatively, the first displaying section 91 and the second displaying section 92 can be expanded and set on the same plane to form one single size-enlarged displaying surface. The first displaying section 91 and the second displaying section 92 may share one common control circuit driving system, or they can be each individually provided with an independent control circuit driving system. Preferably, the first displaying section 91 and the second displaying section 92 have a common control circuit driving system shared therebetween to reduce the number of integrated circuits involved and thus saving cost.

Figure 2:
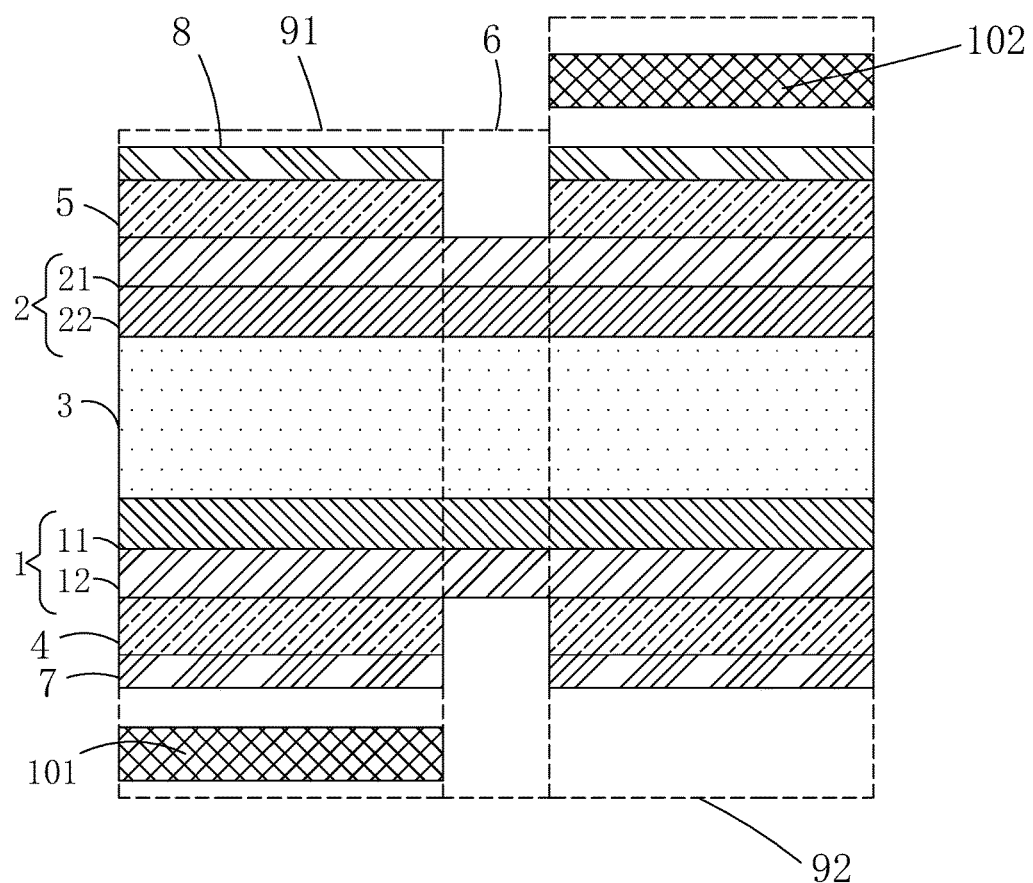
FIG. 2 is a schematic view illustrating a second example of the foldable liquid crystal display device according to the present invention.

Referring to FIG. 2, in a second example of the present invention, the first displaying section 91 and the second displaying section 92 both adopt transmissive displaying, wherein the first polarization plate 7 of the first displaying section 91 is provided, on a side thereof that is distant from the first rigid substrate 4, with a first backlight module 101, and the second polarization plate 8 of the second displaying section 92 is provided, on a side thereof that is distant from the first rigid substrate 4, with a second backlight module 102, or alternatively, the second polarization plate 8 of the first displaying section 91 is provided, on a side thereof that is distant from the first rigid substrate 4, with a first backlight module 101 and the first polarization plate 7 of the second displaying section 92 is provided, on a side thereof that is distant from the first rigid substrate 4, with a second backlight module 102. In other words, the first displaying section 91 and the second displaying section 92 have displaying surfaces, one of which is located on a side associated with the first flexible substrate 1, while the other one is located on a side associated with the second flexible substrate 2. With such an arrangement, the first displaying section 91 and the second displaying section 92 can be expanded and set on the same plane or to define a predetermined angle therebetween to allow viewers to view different images from the first displaying section 91 and the second displaying section 92, whereby the function of the liquid crystal display device is made versatile and, for carrying, the first displaying section 91 and the second displaying section 92 can be folded together to reduce the space occupied thereby to facilitate carrying. The first displaying section 91 and the second displaying section 92 may share one common control circuit driving system, or they can be each individually provided with an independent control circuit driving system. Preferably, the first displaying section 91 and the second displaying section 92 have a common control circuit driving system shared therebetween to reduce the number of integrated circuits involved and thus saving cost.

Figure 3:
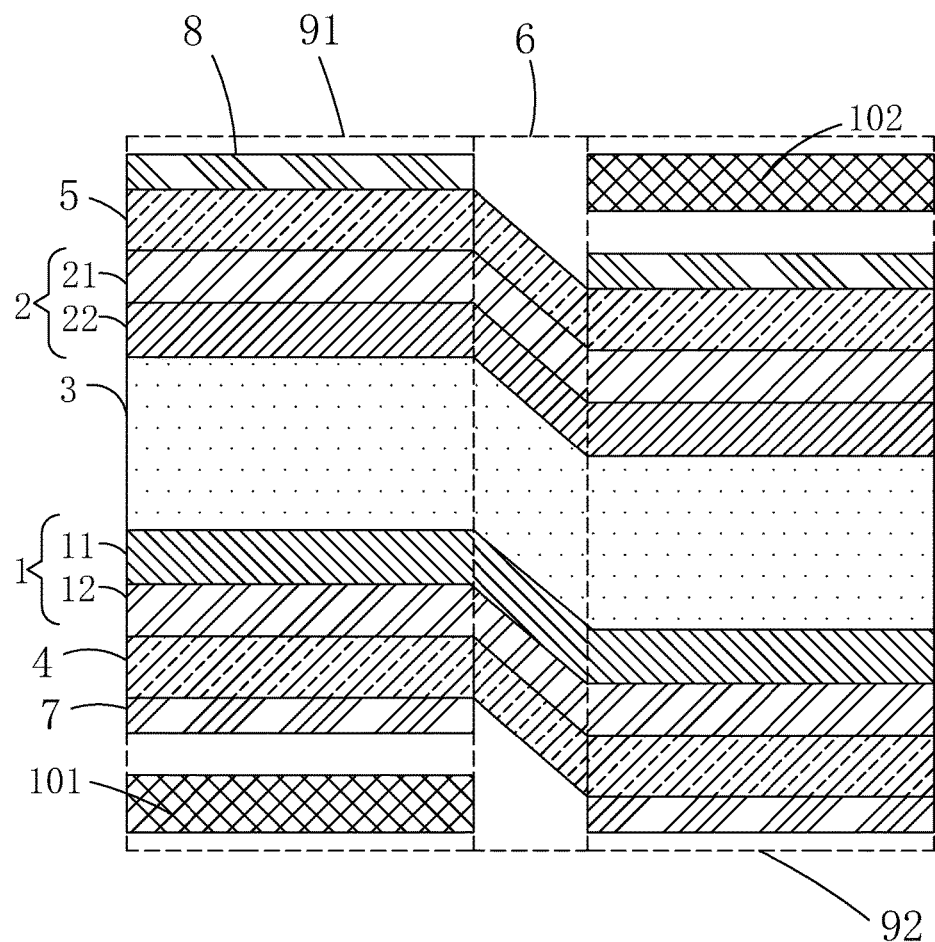
FIG. 3 is a schematic view illustrating a third example of the foldable liquid crystal display device according to the present invention.

Referring to FIG. 3, FIG. 3 shows a third example of the present invention. The third example is different from the second example in that, for the purpose of providing a flat and smooth surface between the first displaying section 91 and the second displaying section 92, when the foldable liquid crystal display device is expanded, the folding section 6 is made inclined or bent at a predetermined angle so that the first displaying section 91 and the second displaying section 92, even respectively provided with backlight modules, may show a flat and smooth surface, this being specifically achievable through adjusting the width of the folding section 6. The remaining is similar to the second example and repeated description will be omitted.

Figure 4:
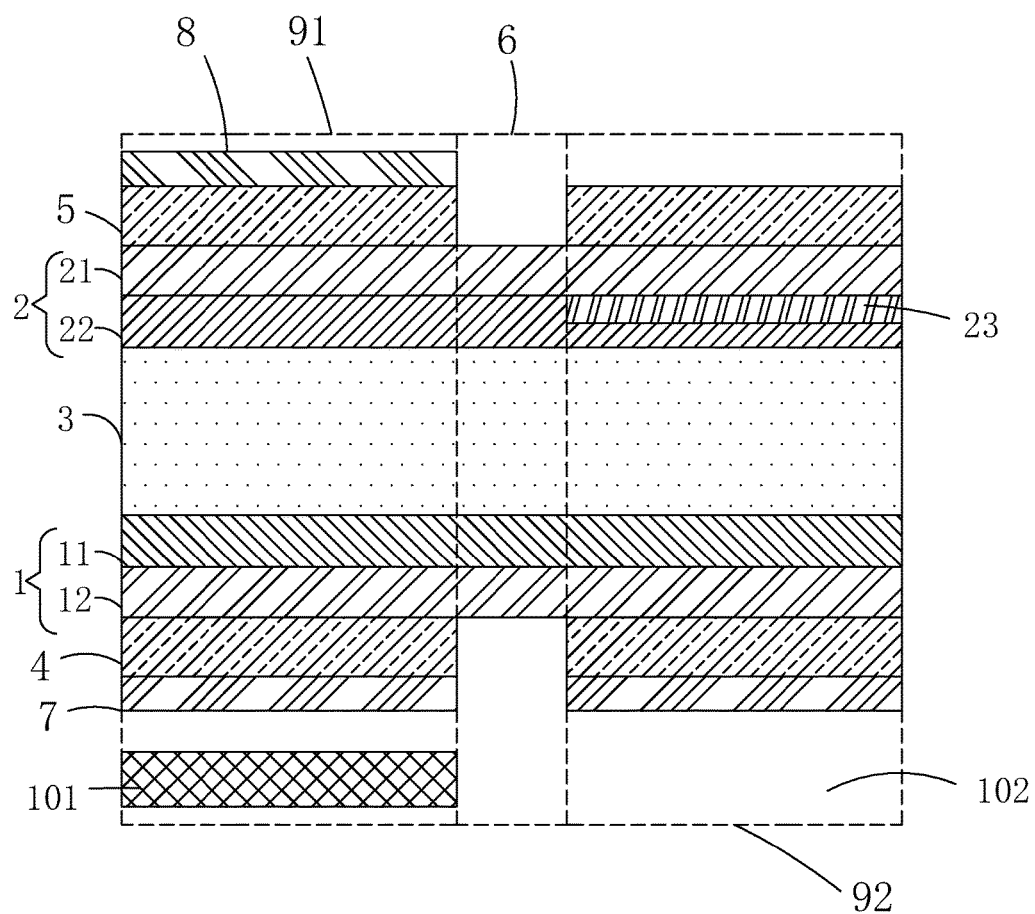
FIG. 4 is a schematic view illustrating a fourth example of the foldable liquid crystal display device according to the present invention.

Referring to FIG. 4, a fourth example of the present invention is shown, wherein a first displaying section 91 adopts transmissive displaying, while a second displaying section 92 adopts reflective displaying. A first polarization plate 7 of the first displaying section 91 is provided, on a side thereof that is distant from a first rigid substrate 4, with a first backlight module 101, and a second flexible substrate 2 of the second displaying section 92 is provided, on a side thereof that is adjacent to the first flexible substrate 1, with a reflective layer 23. In case that the flexible substrate that is provided on a side associated with the reflective layer is a color filter substrate, the reflective layer 23 is arranged between a color filter film of the color filter substrate and a flexible backing plate of that side; in case that the flexible substrate that is provided on the side associated with the reflective layer is an array substrate, the reflective layer 23 can be arranged at any location between the flexible substrate of that side and the liquid crystal layer 3. The reflective layer 23 is generally formed of a metal layer having high reflectivity and may reflect back surrounding environment light that gets incident onto the display device so as to provide a predetermined level of brightness for the second displaying section 92. With such an arrangement, the first displaying section 91 and the second displaying section 92 can be expanded and set on the same plane or to define a predetermined angle therebetween to allow viewers to view different images from the first displaying section 91 and the second displaying section 92, whereby the function of the liquid crystal display device is made versatile and, for carrying, the first displaying section 91 and the second displaying section 92 can be folded together to reduce the space occupied thereby to facilitate carrying.

Further, in the fourth example of the present invention, to provide the first displaying section 91 and the second displaying section 92 with consistent or relatively close optic performance, such as optic performance involving RGB color coordinates and color saturation, the color filter film of the second displaying section 92 has a color photoresist thickness that is one half of that of the first displaying section 91, or alternatively, the color filter film of the second displaying section 92 has a color photoresist thickness that is equal to that of the first displaying section 91 but with the color photoresist of each pixel of the second displaying section 92 being hollowed and partially removed. In order to provide similar phase delay generated by light passing through the liquid crystal layer 3 of the first displaying section 91 one time and light passing through the liquid crystal layer 3 of the second displaying section 92 two times when the voltages on the first displaying section 91 and the second displaying section 92 at two ends of liquid crystal are the same, in order to allow the first displaying section 91 and the second displaying section 92 to share a gamma voltage driving system, the liquid crystal cell thickness of the second displaying section 92 can be make around one half of that of the first displaying section 91, or electrode structures may be modified, such as varying distance between slit electrodes in a fringe field switching (FFS) display mode so as to make distance of slit electrodes of the second displaying section 92 greater than that of the first displaying section 91, and, also, difference of electrode structures of the first displaying section 91 and the second displaying section 92 being achievable with other ways or factors, such as angles and heights of electrodes. To provide better reflective optic performance, the second displaying section 92 may have a display mode that is inconsistent with the first displaying section 91 and electrode structure, initial arrangement of liquid crystal, and application of signals associated with the second displaying section 92 may also be inconsistent with the first displaying section 91. To provide better reflective optic performance, the polarization plate of the second displaying section 92 may be provided with an optic film, such as a quarter wave plate or a half wave plate.

Further, a frontward-disposed backlight module can be provided on a side of the second displaying section 92 associated with the displaying surface.

Figure 5:
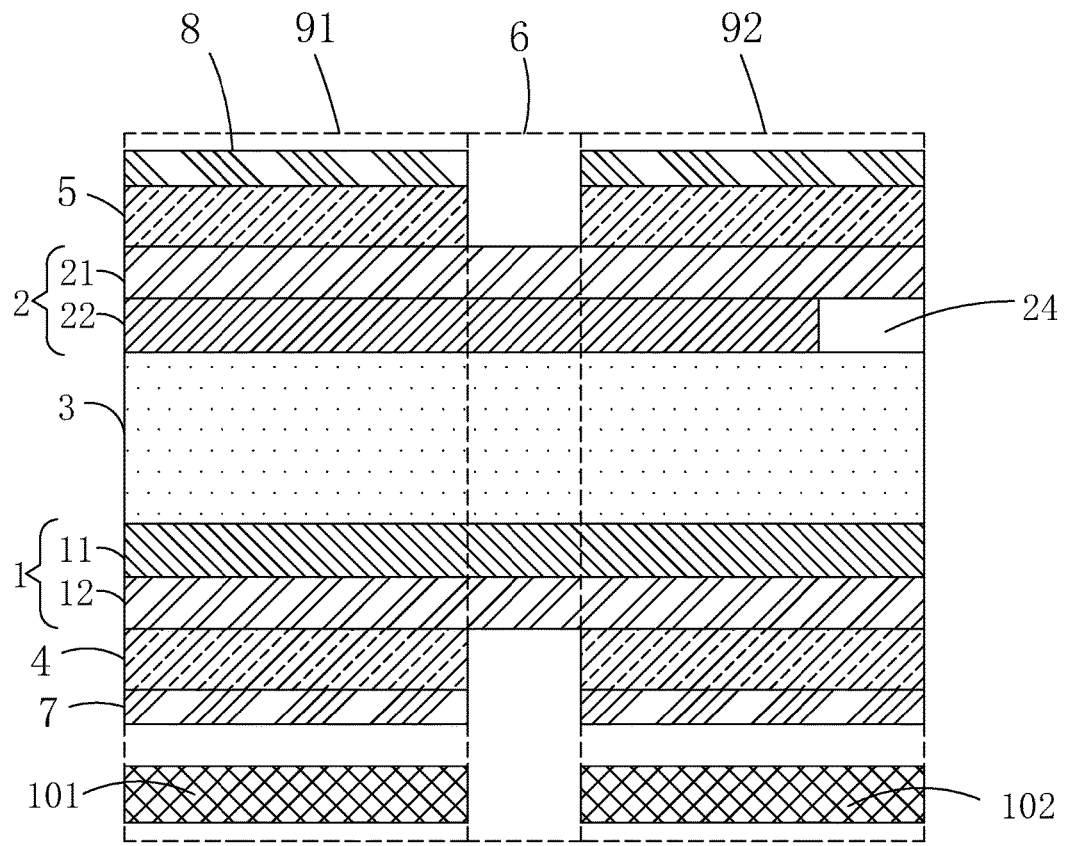
FIG. 5 is a schematic view illustrating a fifth example of the foldable liquid crystal display device according to the present invention.

Referring to FIG. 5, in a fifth example of the present invention, a first displaying section 91 and a second displaying section 92 both adopt transmissive displaying, wherein the first polarization plate 7 of the first displaying section 91 is provided, on a side thereof distant from the first rigid substrate 4, with a first backlight module 101, and the first polarization plate 7 of the second displaying section 92 is provided, on a side thereof distant from the first rigid substrate 4, with a second backlight module 102. In other words, the first displaying section 91 and the second displaying section 92 each have a displaying surface that is located on a side thereof associated with the second flexible substrate 2, and the first displaying section 91 and the second displaying section 92 may have different ranges of viewing angle. The different ranges of viewing angle of the first displaying section 91 and the second displaying section 92 can be achieved through one or multiple ones of different ways of liquid crystal alignment, different ways of driving, different ways of electrode arrangement, and different display modes.

Specifically, the first displaying section 91 and the second displaying section 92 are arranged to have the same display mode or displaying pixels. The first displaying section 91 and the second displaying section 92 may both of FFS display mode. Under such a condition, the different range of viewing angle of the first displaying section 91 and the second displaying section 92 can be achieved with the following two ways. The first way is that a part of a color photoresist layer of a color filter film of the second displaying section 92 of the color filter film is hollowed to form a narrow viewing angle providing zone 24 and liquid crystal under the narrow viewing angle providing zone 24 is aligned to line up in a vertical direction so as to increase light leakage of pixels of the second displaying section 92 and thus reducing contrast and sharpness at a large viewing angle; the second way is that liquid crystal of the second displaying section 92 that is located at the side adjacent to the second flexible substrate 2 is initially aligned with a relatively large pre-tilt angle, such as 30-80 degrees, whereby the high pre-tilt angle generates sideways light leakage to thereby achieve a narrow viewing angle, where the liquid crystal is preferably negative liquid crystal.

Specifically, the different ranges of viewing angle of the first displaying section 91 and the second displaying section 92 can be achieved through adopting different display modes. For example, the first displaying section 91 can be arranged as a multi-domain vertical alignment (MVA) display mode, while the second displaying section 92 is arranged as a vertical alignment (VA) display mode.

Further, each of the above-described foldable liquid crystal display devices may be provided, around an outer circumference thereof, with a flexible protection layer in order to protect the foldable liquid crystal display device and to ensure neatness and integrity of multiple displaying sections before folding. Further, in each of the above-described foldable liquid crystal display devices, in case that the folding section undergoes a relatively small bending angle and the folding section suffers frequent bending, to prevent breaking or cracking of the folding section, the flexible substrates in the folding section may be increased with the thickness thereof to be greater than those of the displaying sections. Increasing of the thickness can be made in a direction toward the interior of liquid crystal cells or in a direction toward the exterior of the liquid crystal cells in order to extend the service life of the foldable liquid crystal display device.

In each of the above-described foldable liquid crystal display devices, the backlight modules can be side-edge backlight modules or direct backlight modules, according to actual requirements.

Figure 6:
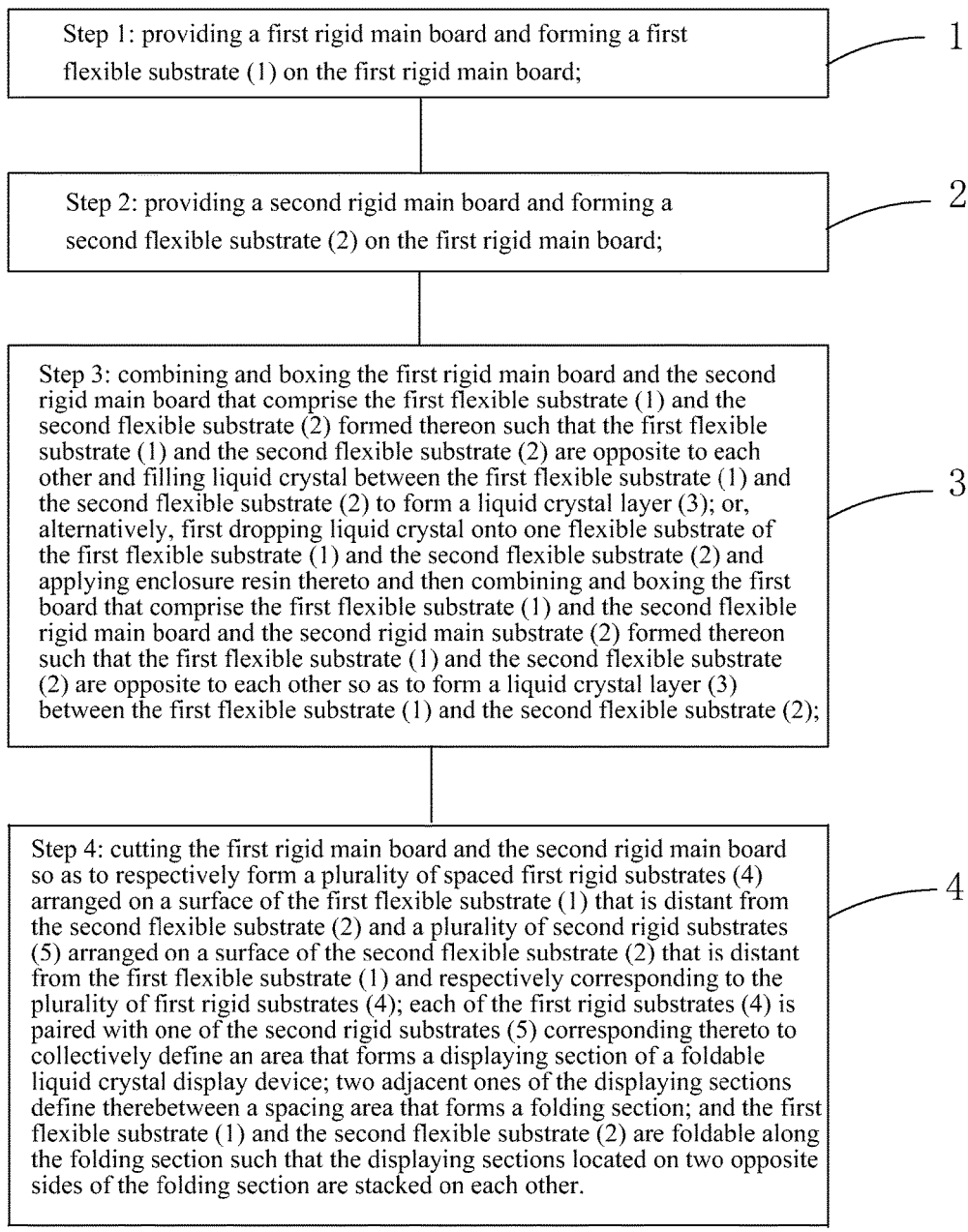
FIG. 6 is a flow chart illustrating a manufacturing method of a foldable liquid crystal display device according to the present invention.

Referring to FIG. 6, based on the above-described foldable liquid crystal display devices, the present invention also provides a manufacturing method of a foldable liquid crystal display device, which comprises the following steps:

Step 1: providing a first rigid main board and forming a first flexible substrate 1 on the first rigid main board.

Step 2: providing a second rigid main board and forming a second flexible substrate 2 on the first rigid main board.

Specifically, the first flexible substrate 1 comprises a first flexible backing plate 12 and a first film layer 11 arranged on the first flexible backing plate 12; and the second flexible substrate 2 comprises a second flexible backing plate 21 and a second film layer 22 arranged on the second flexible backing plate 21. The first film layer 11 may comprise one of an array-substrate function layers assembly and a color-filter-substrate function layers assembly, while the second film layer 22 comprises one of the array-substrate function layers assembly and the color-filter-substrate function layers assembly that is other than and different from that of the first film layer 11. The array-substrate function layers assembly and the color-filter-substrate function layers assembly respectively comprise various film layers that are known arranged on and involved in an array substrate and a color filter substrate of a liquid crystal display device. For example, the array-substrate function layers assembly may comprises: a thin-film transistor array and pixel electrodes arranged on the thin-film transistor array and electrically connected to the thin-film transistor array and the color-filter-substrate function layers assembly may comprise: a color filter film, a black matrix arranged on the color filter film, and a common electrode arranged on the color filter film. The array-substrate function layers assembly and the color-filter-substrate function layers assembly are both known from the prior art and no description will be given herein.

Further, the first rigid substrates 4 and the second rigid substrates 5 can be formed of glass, metal, or ceramics, preferably thin glass sheets. The first and second flexible backing plates 12, 21 can be formed of any suitable insulation materials that are flexible, such as polyimide, polycarbonate, polyestersulfone, polyethylene terephthalate, polyethylene naphthalate, polyarylate, or glass fiber reinforced plastics. The first and second flexible backing plates 12, 21 can be coated on the rigid main boards through a coating process, such as spin coating, slit coating, and inkjet coating.

Step 3: combining and boxing the first rigid main board and the second rigid main board that comprise the first flexible substrate 1 and the second flexible substrate 2 formed thereon such that the first flexible substrate 1 and the second flexible substrate 2 are opposite to each other and filling liquid crystal between the first flexible substrate 1 and the second flexible substrate 2 to form a liquid crystal layer 3, or, alternatively, dropping liquid crystal onto one flexible substrate of the first flexible substrate 1 and the second flexible substrate 2 and applying enclosure resin thereto and combining and boxing the first rigid main board and the second rigid main board that comprise the first flexible substrate 1 and the second flexible substrate 2 formed thereon such that the first flexible substrate 1 and the second flexible substrate 2 are opposite to each other so as to form a liquid crystal layer 3 between the first flexible substrate 1 and the second flexible substrate 2.

Step 4: cutting the first rigid main board and the second rigid main board so as to respectively form a plurality of spaced first rigid substrates 4 arranged on a surface of the first flexible substrate 1 that is distant from the second flexible substrate 2 and a plurality of second rigid substrates 5 arranged on a surface of the second flexible substrate 2 that is distant from the first flexible substrate 1 and respectively corresponding to the plurality of first rigid substrates 4.

Each of the first rigid substrates 4 is paired with one of the second rigid substrates 5 corresponding thereto to collectively define an area that forms a displaying section of the foldable liquid crystal display device.

Two adjacent ones of the displaying sections define therebetween a spacing area that forms a folding section.

The first flexible substrate 1 and the second flexible substrate 2 are foldable along the folding section such that the displaying sections located on two opposite sides of the folding section are stacked on each other.

Specifically, the folding section may have a range of width and may be adjusted according to the size of the liquid crystal display device and the sizes of electronic products that involve the liquid crystal display device, and is preferably between 0-5 mm, and more preferably a relatively small figure, such as 0 mm, 0.1 mm, or 0.2 mm.

Further, the foldable liquid crystal display device may be structured to avoid light leaking in the folding section by adjusting pre-tilt angle of liquid crystal or by arranging a black matrix ton an entire surface.

Further, for displaying sections that adopt transmissive displaying, the first rigid substrates 4 are each provided, on a surface thereof distant from the second rigid substrates 5, with a first polarization plate 7, and the second rigid substrates 5 are each provided, on a surface thereof distant from the first rigid substrates 4, with a second polarization plate 8. For displaying sections that adopt reflective displaying, the rigid substrates that are arranged on the side associated with a displaying surface are each provided, on a surface thereof distant from the liquid crystal layer 3, with a first polarization plate 7, while no polarization plate is provided on a non-displaying surface. Particularly, in case that a polarization plate involved is flexible, the first polarization plates 7 or the second polarization plates 8 that are arranged in a spaced manner can be replaced with an arrangement of full-surface coverage, meaning a first polarization plate 7 or a second polarization plate 8 covers not only the displaying section(s) but also the folding section(s). The polarization plates, which are spaced from each other in a distributive manner, can be formed through a process of attaching independent polarization plates one by one, or a process of attaching one that covers the entire surface and then subjected to cutting, where it can be completed with the same cutting process of the rigid main boards.

Specifically, the rigid main boards and the polarization plate that is provided to cover the entire surface can be cut with a laser cutter or a wheel cutter.

Correspondingly, an embodiment of a foldable display device manufactured with the manufacturing method of the foldable liquid crystal display device can be identical to any one of the above-described first to fifth examples and repeated description will be omitted herein.

In summary, the present invention provides a foldable liquid crystal display device, which comprises a plurality of displaying sections and each of the displaying sections comprises a pair of rigid substrates, wherein the displaying sections are connected together with flexible substrates and folding sections are provided between the displaying sections so that the flexible substrates are foldable along the folding sections to have the displaying sections of the liquid crystal display device stacked on each other, whereby expanding the plurality of displaying sections allows for expansion of a displaying area of the liquid crystal display device and folding the plurality of displaying sections allows for reduction of space occupied by the liquid crystal display device to facilitate carrying. By adopting different display modes for different ones of the displaying sections, application scenarios of the liquid crystal display device can be made versatile. The present invention also provides a manufacturing method of a foldable liquid crystal display device, which helps achieve foldability of a liquid crystal display device, expands a displaying area of a liquid crystal display device involved in a small-sized terminal device, enriches application scenarios of a liquid crystal display device, and simplifies a manufacturing process of a foldable liquid crystal display device.

Based on the description given above, those having ordinary skills of the art may easily contemplate various changes and modifications of the technical solution and technical ideas of the present invention and all these changes and modifications are considered within the protection scope of right for the present invention as defined in the appended claims.

What is claimed is:

1. A foldable liquid crystal display device, comprising a first flexible substrate, a second flexible substrate opposite to the first flexible substrate, a liquid crystal layer arranged between the first flexible substrate and the second flexible substrate, a plurality of first rigid substrates arranged apart from each other on a surface of the first flexible substrate that is distant from the second flexible substrate, and a plurality of second rigid substrates arranged on a surface of the second flexible substrate that is distant from the first flexible substrate and respectively corresponding to the plurality of first rigid substrates;

each first rigid substrate being paired with one of the plurality of second rigid substrates corresponding to define an area that forms a displaying section of the foldable liquid crystal display device;

a spacing area is defined between two adjacent displaying sections, and the spacing area forms a folding section;

wherein the first flexible substrate and the second flexible substrate are foldable along the folding section such that the two adjacent displaying sections located on two opposite sides of the folding section are stacked on each other or define an included angle therebetween.

2. The foldable liquid crystal display device as claimed in claim 1, wherein the first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the first polarization plate of the second displaying section being provided, on a side thereof that is distant from the first rigid substrates, with a second backlight module.

3. The foldable liquid crystal display device as claimed in claim 1, wherein the first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the second polarization plate of the second displaying section being provided, on a side thereof that is distant from the second rigid substrates, with a second backlight module.

4. The foldable liquid crystal display device as claimed in claim 2, wherein the first displaying section and the second displaying section have different ranges of viewing angle.

5. The foldable liquid crystal display device as claimed in claim 1, wherein the first rigid substrates and the second rigid substrates each have a number of two to respectively define two displaying sections and one folding section, the two displaying sections being respectively defined as a first displaying section and a second displaying section;

the first displaying section adopting transmissive displaying, the second displaying section adopting reflective displaying;

the first rigid substrate of the first displaying section being provided, on a surface thereof that is distant from the second rigid substrates, with a first polarization plate, the second rigid substrate of the first displaying section being provided, on a surface thereof that is distant from the first rigid substrates, with a second polarization plate;

the first rigid substrate of the second displaying section being provided, on a surface thereof that is distant from the second rigid substrates, with another first polarization plate;

the first polarization plate of the first displaying section being provided, on a side thereof that is distant from the first rigid substrates, with a first backlight module;

the second flexible substrate of the second displaying section being provided, on a side thereof adjacent to the first flexible substrate, with a reflective layer.

6. A manufacturing method of a foldable liquid crystal display device, comprising the following steps:
(1) providing a first rigid main board and forming a first flexible substrate on the first rigid main board;
(2) providing a second rigid main board and forming a second flexible substrate on the first rigid main board;
(3) combining and boxing the first rigid main board and the second rigid main board that comprise the first flexible substrate and the second flexible substrate formed thereon such that the first flexible substrate and the second flexible substrate are opposite to each other and filling liquid crystal between the first flexible substrate and the second flexible substrate to form a liquid crystal layer; or, alternatively, first dropping liquid crystal onto one flexible substrate of the first flexible substrate and the second flexible substrate and applying enclosure resin thereto and then combining and boxing the first rigid main board and the second rigid main board that comprise the first flexible substrate and the second flexible substrate formed thereon such that the first flexible substrate and the second flexible substrate are opposite to each other and a liquid crystal layer is formed between the first flexible substrate and the second flexible substrate; and
(4) cutting the first rigid main board and the second rigid main board so as to respectively form a plurality of first rigid substrates arranged apart from each other on a surface of the first flexible substrate that is distant from the second flexible substrate and a plurality of second rigid substrates arranged on a surface of the second flexible substrate that is distant from the first flexible substrate and respectively corresponding to the plurality of first rigid substrates;
wherein each first rigid substrate is paired with one of the plurality of second rigid substrates corresponding to define an area that forms a displaying section of the foldable liquid crystal display device;
a spacing area is defined between two adjacent displaying sections, and the spacing area forms a folding section; and
the first flexible substrate and the second flexible substrate are foldable along the folding section such that the two adjacent displaying sections located on two opposite sides of the folding section are stacked on each other or define an included angle therebetween.

7. The manufacturing method of the foldable liquid crystal display device as claimed in claim 6, wherein the first rigid substrates and the second rigid substrates each have a number of two to respectively define two displaying sections and one folding section, the two displaying sections being respectively defined as a first displaying section and a second displaying section;
the first displaying section and the second displaying section both adopting transmissive displaying;
each of the first rigid substrates being provided, on a surface thereof that is distant from the second rigid substrates, with a first polarization plate, each of the second rigid substrates being provided, on a surface thereof that is distant from the first rigid substrates, with a second polarization plate;
the first polarization plate of the first displaying section being provided, on a side thereof that is distant from the first rigid substrates, with a first backlight module;
the first polarization plate of the second displaying section being provided, on a side thereof that is distant from the first rigid substrates, with a second backlight module.

8. The manufacturing method of the foldable liquid crystal display device as claimed in claim 6, wherein the first rigid substrates and the second rigid substrates each have a number of two to respectively define two displaying sections and one folding section, the two displaying sections being respectively defined as a first displaying section and a second displaying section;
the first displaying section and the second displaying section both adopting transmissive displaying;
each of the first rigid substrates being provided, on a surface thereof that is distant from the second rigid substrates, with a first polarization plate, each of the second rigid substrates being provided, on a surface thereof that is distant from the first rigid substrates, with a second polarization plate;
the first polarization plate of the first displaying section being provided, on a side thereof that is distant from the first rigid substrates, with a first backlight module;
the second polarization plate of the second displaying section being provided, on a side thereof that is distant from the second rigid substrates, with a second backlight module.

9. The manufacturing method of the foldable liquid crystal display device as claimed in claim 7, wherein the first displaying section and the second displaying section have different ranges of viewing angle.

10. The manufacturing method of the foldable liquid crystal display device as claimed in claim 6, wherein the first rigid substrates and the second rigid substrates each have a number of two to respectively define two displaying sections and one folding section, the two displaying sections being respectively defined as a first displaying section and a second displaying section;
the first displaying section adopting transmissive displaying, the second displaying section adopting reflective displaying;
the first rigid substrate of the first displaying section being provided, on a surface thereof that is distant from the second rigid substrates, with a first polarization plate, the second rigid substrate of the first displaying section being provided, on a surface thereof that is distant from the first rigid substrates, with a second polarization plate;
the first rigid substrate of the second displaying section being provided, on a surface thereof that is distant from the second rigid substrates, with a first polarization plate;
the first polarization plate of the first displaying section being provided, on a side thereof that is distant from the first rigid substrates, with a first backlight module;
the second flexible substrate of the second displaying section being provided, on a side thereof adjacent to the first flexible substrate, with a reflective layer.

11. A foldable liquid crystal display device, comprising a first flexible substrate, a second flexible substrate opposite to the first flexible substrate, a liquid crystal layer arranged between the first flexible substrate and the second flexible substrate, a plurality of first rigid substrates arranged apart from each other on a surface of the first flexible substrate that is distant from the second flexible substrate, and a plurality of second rigid substrates arranged on a surface of the second flexible substrate that is distant from the first flexible substrate and respectively corresponding to the plurality of first rigid substrates;
each first rigid substrate being paired with one of the plurality of second rigid substrate corresponding to define an area that forms a displaying section of the foldable liquid crystal display device;

a spacing area is defined between two adjacent displaying sections, and the spacing area forms a folding section;

wherein the first flexible substrate and the second flexible substrate are foldable along the folding section such that the two adjacent displaying sections located on two opposite sides of the folding section are stacked on each other or define an included angle therebetween;

wherein the first rigid substrates and the second rigid substrates each have a number of two to respectively define two displaying sections and one folding section, the two displaying sections being respectively defined as a first displaying section and a second displaying section;

the first displaying section and the second displaying section both adopting transmissive displaying;

each of the first rigid substrates being provided, on a surface thereof that is distant from the second rigid substrates, with a first polarization plate, each of the second rigid substrates being provided, on a surface thereof that is distant from the first rigid substrates, with a second polarization plate;

the first polarization plate of the first displaying section being provided, on a side thereof that is distant from the first rigid substrates, with a first backlight module;

the second polarization plate of the second displaying section being provided, on a side thereof that is distant from the second rigid substrates, with a second backlight module.

12. The foldable liquid crystal display device as claimed in claim 11, wherein the first displaying section and the second displaying section have different ranges of viewing angle.

* * * * *